No. 879,136. PATENTED FEB. 18, 1908.
J. W. ANGEL.
FISH TRAP.
APPLICATION FILED JUNE 27, 1907.
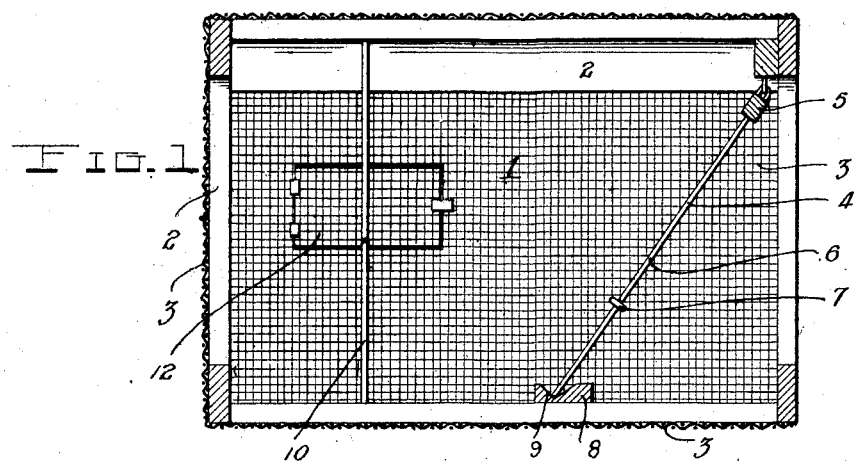
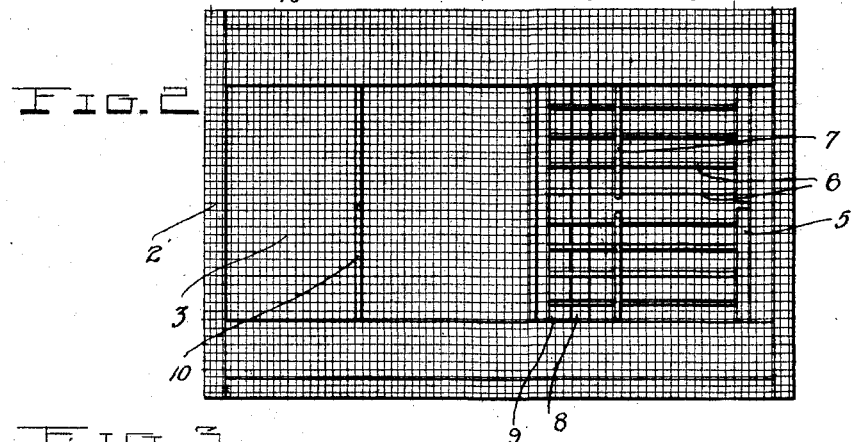
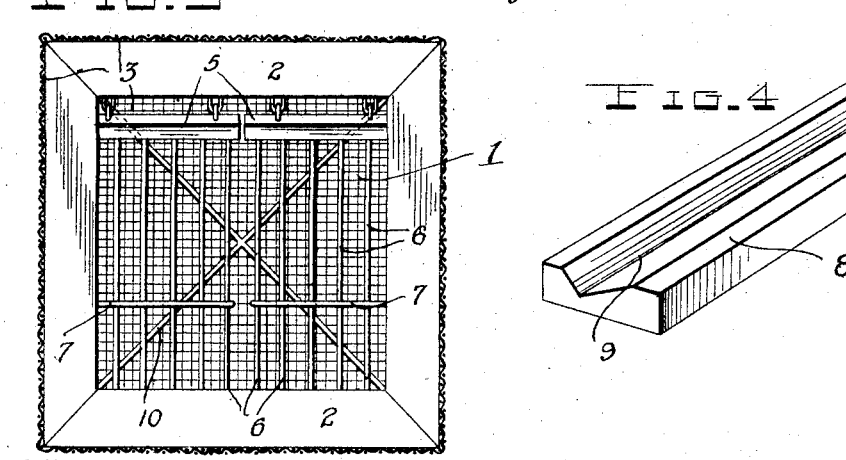
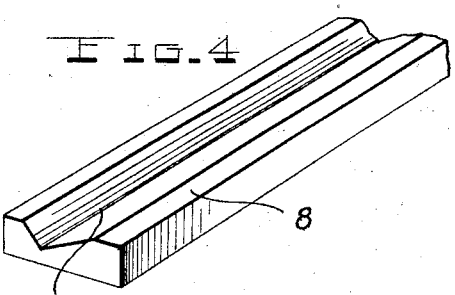
Witnesses
Chas. R. Griesbauer.
C. H. Griesbauer.
Inventor
John W. Angel.
by H. B. Willson & Co.
Attorneys

UNITED STATES PATENT OFFICE.

JOHN W. ANGEL, OF RISING STAR, TEXAS.

FISH-TRAP.

No. 879,136.     Specification of Letters Patent.     Patented Feb. 18, 1908.

Application filed June 27, 1907. Serial No. 381,107.

*To all whom it may concern:*

Be it known that I, JOHN W. ANGEL, a citizen of the United States, residing at Rising Star, in the county of Eastland and State of Texas, have invented certain new and useful Improvements in Fish-Traps; and I do declare the following to be a full, clear, and exact description of the invention, such as will enable others skilled in the art to which it appertains to make and use the same.

This invention relates to improvements in fish traps.

The object of the invention is to provide an improved construction of fish trap adapted to be baited to attract fish into the same, means being provided to prevent any possibility of the fish getting under or lifting the door after passing into the trap.

With this object in view, the invention consists of certain novel features of construction, combination and arrangements of parts as will be more fully described and particularly pointed out in the appended claims.

In the accompanying drawings, Figure 1 is a vertical longitudinal sectional view through a trap constructed in accordance with the invention; Fig. 2 is a top plan view; Fig. 3 is an end elevation; and Fig. 4 is a detail view of the grooved or recessed bar which receives the lower ends of the wires forming the doors of the trap.

Referring more particularly to the drawings, 1 denotes the trap, which consists of a frame, 2, formed of suitable metal and covered on all sides by a wire screen or network, 3. The trap may be constructed to permit entrance at one or both ends, the same being shown in the present instance as having but one end open, the opposite end being closed by the wire netting, similar to the netting which covers the sides.

The open end of the trap is provided with a drop door 4, which is here shown and is preferably formed of a series of sections, each of which consists of an upper cross bar, 5, hingedly connected to the upper cross bar of the forward end of the trap. To the cross bars 5 are secured downwardly and inwardly inclined wire rods or bars, 6, which are spaced apart and held in position near their lower ends by cross wires, 7, which prevent the bars 6 from being forced apart.

The door is formed of a plurality of sections to adapt the trap for use in catching both large or small fish or animals. A small fish or animal will have sufficient strength to raise a single section of the door and enter the trap, while it would be unable to lift the door formed of a single piece and of a size to fit an opening such as would be necessary for the entrance of large fish, and consequently, if the door were not made in independently operable sections, no small game or fish could be caught.

The lower ends of the wires 7 drop onto a supporting bar 8, which is arranged transversely of the trap and is secured to the lower side of the frame, 2, some distance in from the forward open end of the trap, thus supporting the door sections at an inward inclination. The bar 8 has formed therein a longitudinally disposed, substantially V-shaped groove or channel, 9, which is adapted to receive the lower ends of the wires, 6, thus effectually preventing the fish from getting under the end of the bars and lifting the door sections. Arranged in the trap are inwardly projecting bait-holding rods or wires, 10, upon which bait is adapted to be placed to attract the fish into the trap. In the top or one side of the trap is formed an opening adapted to be closed by a door, 12, to provide access to the trap for the purpose of baiting the same, or removing the fish caught therein.

While the trap is particularly adapted and is herein described for the purpose of catching fish, it is obvious that the same may be used for catching various kinds of animals and birds.

Having thus fully described my invention, what I claim as new and desire to secure by Letters-Patent, is:

In a fish trap, a frame consisting of substantially square end pieces and connecting side pieces, a wire covering for the same, covering the sides and one end the other end being left open, a door for the open end consisting of a plurality of sections each section comprising an upper cross bar and a plurality of downwardly and inwardly inclined wire rods with their ends rigidly fastened in said cross bar and rigidly held in parallelism by said cross bar and a supporting bar connecting said rods near their ends, staples fastened under an upper cross piece of the frame of said open end, staples in said cross bars hingedly connecting said door sections to said cross piece, a grooved bar lying transversely across the bottom, of the trap the groove thereof being adapted to receive the lower ends of said rods, and diagonally disposed bait holding rods connecting diagonally opposite side pieces.

In testimony whereof I have hereunto set my hand in presence of two subscribing witnesses.

JOHN W. ANGEL.

Witnesses:
ALBERT TYSON,
SID W. SMITH.